United States Patent
Nakayama et al.

(10) Patent No.: US 10,584,733 B2
(45) Date of Patent: Mar. 10, 2020

(54) RELOCATING MECHANISM OF INDUSTRIAL MACHINE

(71) Applicant: Fanuc Corporation, Yamanashi (JP)

(72) Inventors: Kazutaka Nakayama, Yamanashi (JP); Masahiro Morioka, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 16/410,635

(22) Filed: May 13, 2019

(65) Prior Publication Data

US 2019/0264721 A1 Aug. 29, 2019

Related U.S. Application Data

(62) Division of application No. 16/101,906, filed on Aug. 13, 2018.

(30) Foreign Application Priority Data

Sep. 28, 2017 (JP) ................................. 2017-188166

(51) Int. Cl.
*B25J 5/00* (2006.01)
*F16B 13/12* (2006.01)
(Continued)

(52) U.S. Cl.
CPC ............. *F16B 13/124* (2013.01); *B25J 5/007* (2013.01); *B25J 9/0009* (2013.01); *B25J 9/042* (2013.01); *B25J 9/046* (2013.01); *B25J 13/089* (2013.01)

(58) Field of Classification Search
CPC ............ B25J 5/007; B25J 9/0009; F16M 3/00
(Continued)

(56) References Cited

U.S. PATENT DOCUMENTS 1,581,643 A * 4/1926 Kurowski ................ B41J 29/13
   248/680
2,192,337 A * 3/1940 Tiffany .................... B60B 33/06
   108/80

(Continued)

FOREIGN PATENT DOCUMENTS

EP   1815950 A1   8/2007
JP   S48-99570 U  11/1973
(Continued)

OTHER PUBLICATIONS

Matsui, Hironori; Notice of Reasons for Refusal for Japanese Application No. 2017-188166; dated Aug. 6, 2019; 4 pages.

(Continued)

*Primary Examiner* — Bradley Duckworth
(74) *Attorney, Agent, or Firm* — Winstead PC (57) ABSTRACT

Provided is an industrial machine including a base including a through hole vertically passing through the base and installed on an installation surface F using a fastener through the through hole and a friction reducing member configured to protrude from a bottom surface of the base to reduce friction between the base and the installation surface. The friction reducing member is lowered below the bottom surface of the base during relocation and raised to the same level as or above the bottom surface of the base during installation by a vertical force applied to the base using the through hole.

2 Claims, 7 Drawing Sheets

(51) Int. Cl.
*B25J 9/00* (2006.01)
*B25J 9/04* (2006.01)
*B25J 13/08* (2006.01)

(58) Field of Classification Search
USPC .............................. 248/501, 680, 129, 188.8
See application file for complete search history.

(56) References Cited

U.S. PATENT DOCUMENTS

| | | | | |
|---|---|---|---|---|
| 2,311,668 | A * | 2/1943 | Kennedy | F16M 3/00 248/130 |
| 2,575,968 | A * | 11/1951 | McCallum | F16M 3/00 280/79.11 |
| 2,843,392 | A * | 7/1958 | Simpkins | B60B 33/06 280/43.14 |
| 4,187,578 | A * | 2/1980 | Little | B60B 33/0002 16/29 |
| 4,447,183 | A | 5/1984 | Yunt | |
| 5,118,262 | A | 6/1992 | Kuo | |
| 5,457,849 | A * | 10/1995 | Branson | B60B 33/04 16/19 |
| 5,535,843 | A | 7/1996 | Takeda et al. | |
| 5,785,293 | A * | 7/1998 | Ford | F16M 11/42 248/649 |
| 5,842,678 | A * | 12/1998 | Svejkovsky | F16M 7/00 248/650 |
| 6,024,330 | A * | 2/2000 | Mroz | F16M 7/00 248/188.4 |
| 6,626,447 | B2 * | 9/2003 | Nelson | F16L 55/28 138/98 |
| 7,530,581 | B1 * | 5/2009 | Squires, Sr. | B62B 3/04 280/47.35 |
| 7,584,935 | B2 * | 9/2009 | Chen | B25H 1/04 248/647 |
| 8,246,059 | B2 * | 8/2012 | Gass | F16M 3/00 248/651 |
| 8,387,951 | B2 * | 3/2013 | Johnson | B62B 3/0625 254/8 R |
| 8,464,820 | B2 * | 6/2013 | Riesner | B25J 5/007 180/121 |
| 8,506,555 | B2 * | 8/2013 | Ruiz Morales | B25J 9/041 606/1 |
| 8,693,916 | B2 | 4/2014 | Masuda et al. | |
| 8,851,441 | B2 * | 10/2014 | Acuna | F16M 3/00 206/319 |
| 8,857,774 | B2 * | 10/2014 | Aoyama | B60B 33/0002 108/177 |
| 9,045,253 | B2 * | 6/2015 | Hacko | B62B 5/0433 |
| 9,714,585 | B2 * | 7/2017 | Morey | B62B 3/02 |
| 10,071,488 | B2 | 9/2018 | Robinson et al. | |
| 10,088,094 | B2 * | 10/2018 | Craig | F16M 7/00 |
| 10,123,842 | B2 * | 11/2018 | Iceman | B25J 5/007 |
| 2003/0127815 | A1 * | 7/2003 | Hall | B60B 33/0002 280/79.3 |
| 2009/0024142 | A1 | 1/2009 | Ruiz Morales | |
| 2010/0155561 | A1 | 6/2010 | Chou et al. | |
| 2011/0258847 | A1 | 10/2011 | Meisho et al. | |
| 2018/0073672 | A1 * | 3/2018 | Varner | F04B 53/16 |
| 2018/0290290 | A1 * | 10/2018 | Uchiyama | B25H 1/04 |
| 2019/0090964 | A1 * | 3/2019 | Rosenberg | B25J 5/007 |
| 2019/0091854 | A1 | 3/2019 | Nakayama et al. | |
| 2019/0091855 | A1 | 3/2019 | Nakayama et al. | |
| 2019/0135600 | A1 * | 5/2019 | Waller | B66F 9/07504 |

FOREIGN PATENT DOCUMENTS

| | | |
|---|---|---|
| JP | S52-63527 U | 5/1977 |
| JP | S60-77442 U | 5/1985 |
| JP | S61-5585 U | 1/1986 |
| JP | S62-20772 U | 2/1987 |
| JP | H02-39901 U | 3/1990 |
| JP | H10-118973 A | 5/1998 |
| JP | H10-244804 A | 9/1998 |
| JP | 2002-327553 A | 11/2002 |
| JP | 2007-290096 A | 11/2007 |
| JP | 2009-525098 A | 7/2009 |
| JP | 4820395 B2 | 11/2011 |
| JP | 2014-151369 A | 8/2014 |
| JP | 2019-063876 A | 4/2019 |
| JP | 2019-063877 A | 4/2019 |
| WO | WO-2002052987 A1 | 7/2002 |
| WO | WO-2007088208 A1 | 8/2007 |

OTHER PUBLICATIONS

Matsui, Hironori; Notice of Reasons for Refusal for Japanese Patent Application No. 2017-188166; dated Nov. 19, 2019; 5 pages.

* cited by examiner

RELOCATING MECHANISM OF INDUSTRIAL MACHINE

CROSS-REFERENCE TO RELATED APPLICATIONS

This application is a divisional of, and incorporates by reference, U.S. patent application Ser. No. 16/101,906, filed on Aug. 13, 2018. U.S. patent application Ser. No. 16/101,906 claims the benefit of Japanese Patent Application No. 2017-188166, the content of which is incorporated herein by reference.

TECHNICAL FIELD

The present invention relates to industrial machines and relocating mechanisms thereof.

BACKGROUND ART

Robots including casters under the base and outriggers for raising and lowering the base are well known (for example, see PTL 1).

When the robot described in PTL 1 is installed, the robot is supported by outriggers lowered to lift the base and casters. On the other hand, when the robot is relocated, the outriggers are raised, and a horizontal force is applied to the robot to roll the casters to move the robot in the horizontal direction while the entire weight of the robot is supported by the casters.

CITATION LIST

Patent Literature

{PTL 1} Japanese Unexamined Utility Model Application, Publication No. Sho 62-20772

SUMMARY OF INVENTION

An aspect of the present invention provides an industrial machine including a base including a through hole vertically passing through the base and installed on an installation surface using a fastener through the through hole and a friction reducing member configured to protrude from a bottom surface of the base to reduce friction between the base and the installation surface. The friction reducing member is lowered below the bottom surface of the base during relocation and raised to the same level as or above the bottom surface of the base during installation by a vertical force applied to the base using the through hole.

Moreover, another aspect of the present invention provides a relocating mechanism of an industrial machine including a bracket attachable to a through hole using a second fastener while a first fastener is removed from the through hole, the industrial machine including a base including the through hole vertically passing through the base and the base being installed onto an installation surface using the first fastener through the through hole, and a friction reducing member attached to the bracket. The friction reducing member is lowered below a bottom surface of the base by a vertical force applied between the base and the bracket by the second fastener using the through hole during relocation of the industrial machine.

DESCRIPTION OF EMBODIMENTS

An industrial machine 1 according to an embodiment of the present invention will now be described with reference to the drawings.

Figure 1:
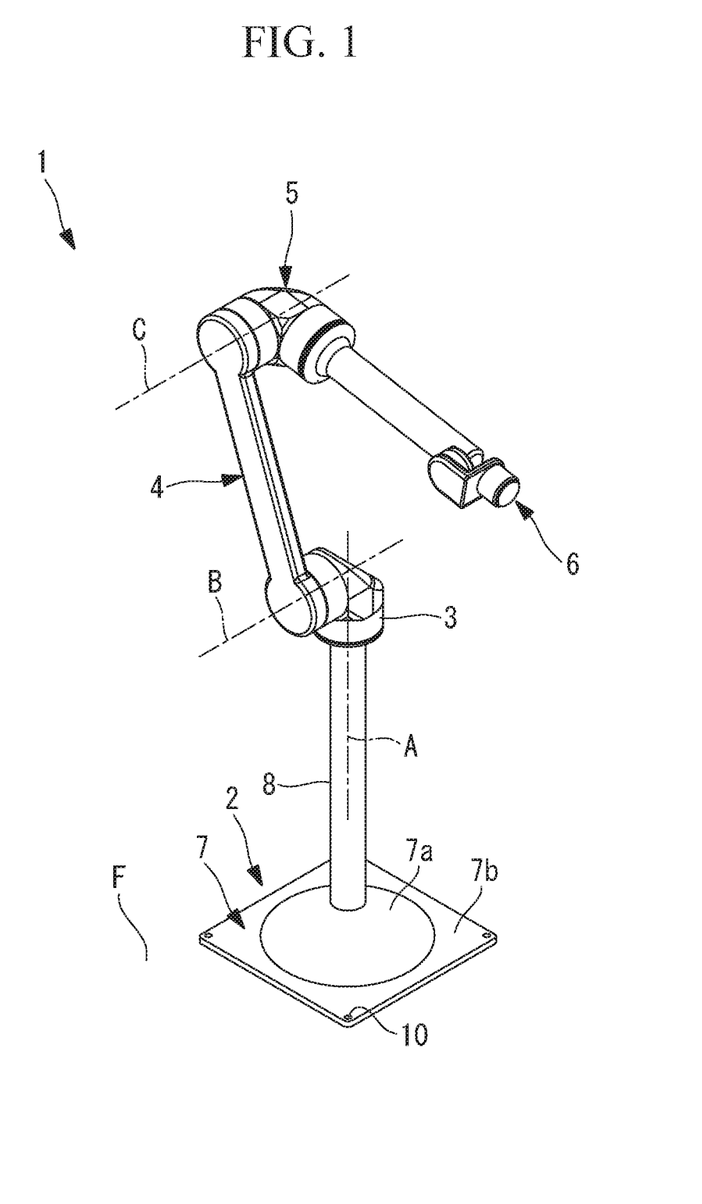
FIG. 1 is a perspective view of an industrial machine according to an embodiment of the present invention.

As illustrated in FIG. 1, the industrial machine 1 according to this embodiment is a six-axis vertical articulated robot (hereinafter referred to as "robot 1") including a base 2 installed on a floor surface (installation surface) F, a swivel body 3 rotatably supported with respect to the base 2 about a vertical first axis (vertical axis) A, a first arm 4 swingably supported with respect to the swivel body 3 on a horizontal second axis (first horizontal axis) B, a second arm 5 swingably supported at the tip of the first arm 4 on a third axis (second horizontal axis) C parallel to the second axis B, and a three-axis wrist 6 disposed at the tip of the second arm 5.

The base 2 includes a flat supporting leg member 7 that is substantially square when viewed in plan and expands along the floor surface F, and a cylindrical columnar member 8 extending vertically upward from the center of the supporting leg member 7. The swivel body 3 is rotatably supported at the top end of the columnar member 8.

As illustrated in FIG. 1, the first arm 4 is offset from the columnar member 8 in a radial direction to be rotatable in a plane remote from and parallel to the longitudinal axis of the columnar member 8. The first arm 4 has a length smaller than the length of the columnar member 8 of the base 2, and can rotate 360°. Moreover, the thickness (cross section) of the columnar member 8 is substantially identical to the thickness (cross section) of the first arm 4.

As illustrated in FIG. 1, the second arm 5 is offset by the same amount in a radial direction opposite to the radial direction in which the first arm 4 is offset from the columnar member 8 to be rotatable in a plane including the longitudinal axis of the columnar member 8. Thus, the central axis of the second arm 5 and the central axis of the columnar member 8 are disposed in the same plane.

The supporting leg member 7 of the base 2 includes a frustum-shaped portion 7a extending slightly upward in the center and a tabular rim portion 7b horizontally expanding around the circumference of the frustum-shaped portion 7a.

The rim portion 7b is substantially square when viewed in plan, and includes through holes 9 passing through the rim portion 7b in the thickness direction at the four corners. The through holes 9 have an inner diameter allowing anchor bolts (fastener, first fastener) 10 to pass through, and thus the robot 1 can be secured onto the floor surface F using the anchor bolts 10.

Each of the through holes 9 has a counterbore 9a formed in the upper part to accommodate the head of an anchor bolt 10. In an example illustrated in FIG. 4, the counterbore 9a has a depth that can accommodate the entire head of the anchor bolt 10. However, the counterbore 9a may have a depth that can partially accommodate the anchor bolt 10.

Figure 3:
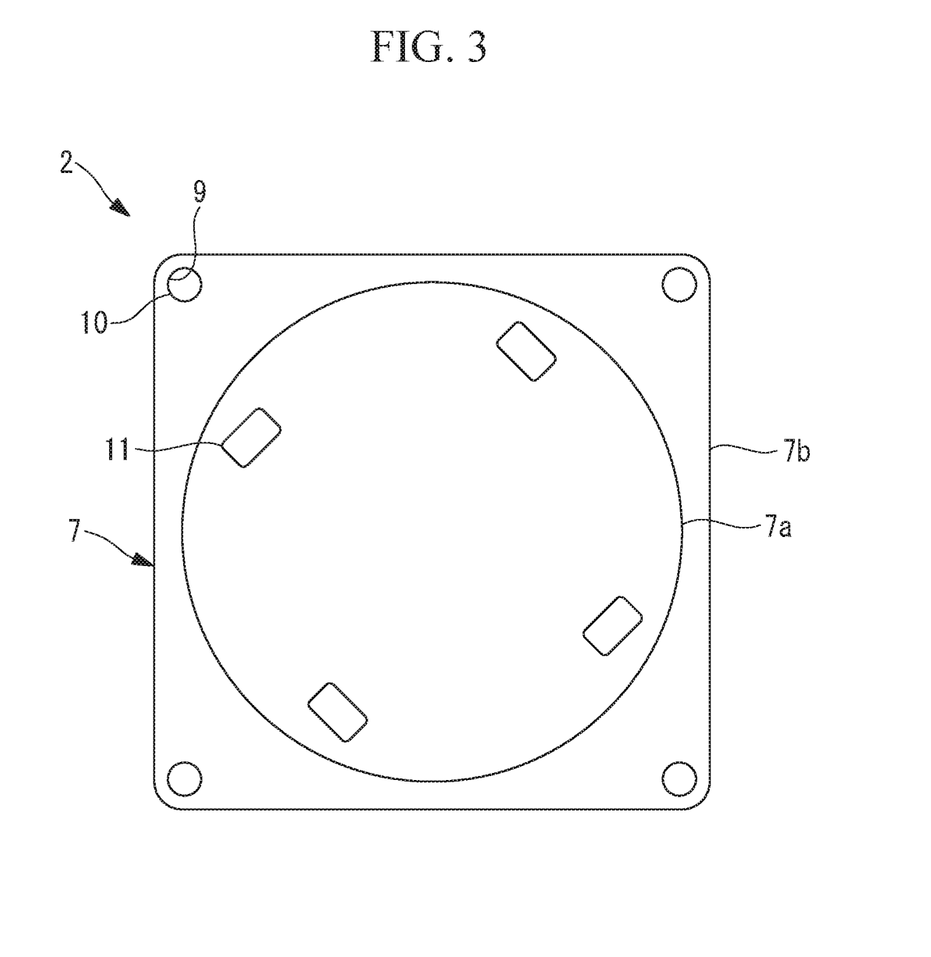
FIG. 3 is a bottom view of the industrial machine illustrated in FIG. 1.
Figure 4:
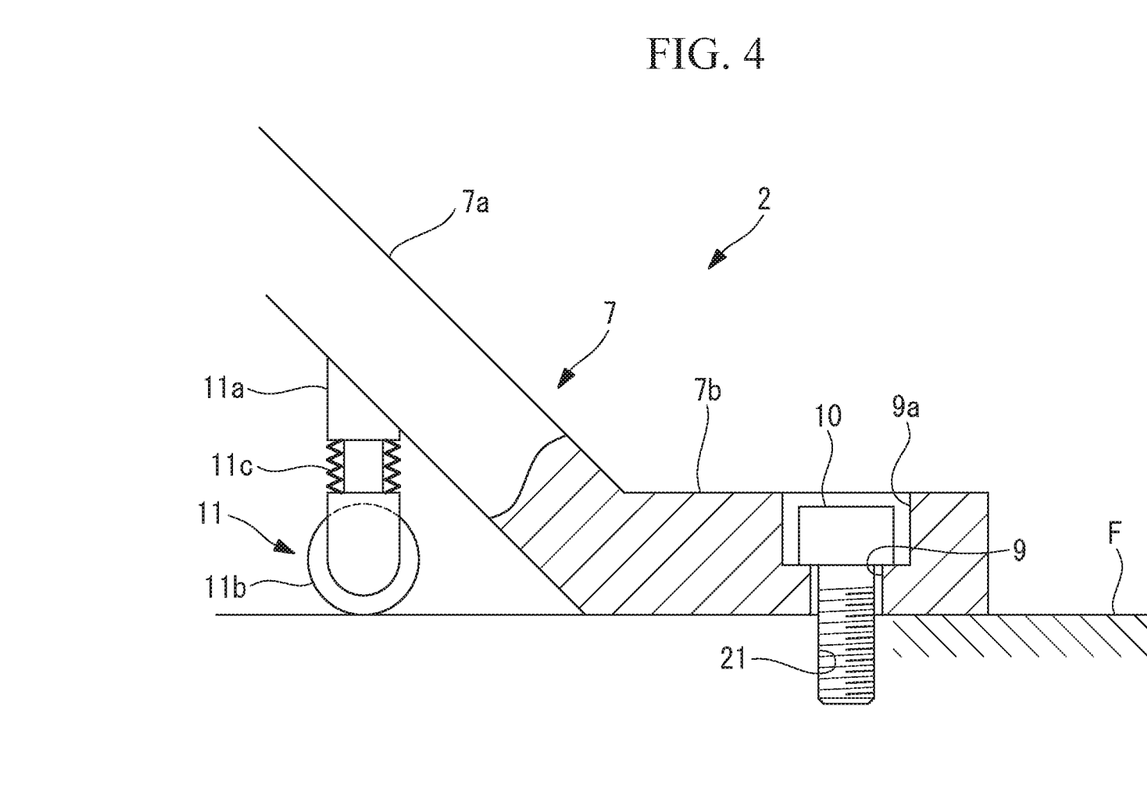
FIG. 4 is a partial longitudinal sectional view illustrating the base of the industrial machine illustrated in FIG. 1 in firm contact with the floor surface.
Figure 5:
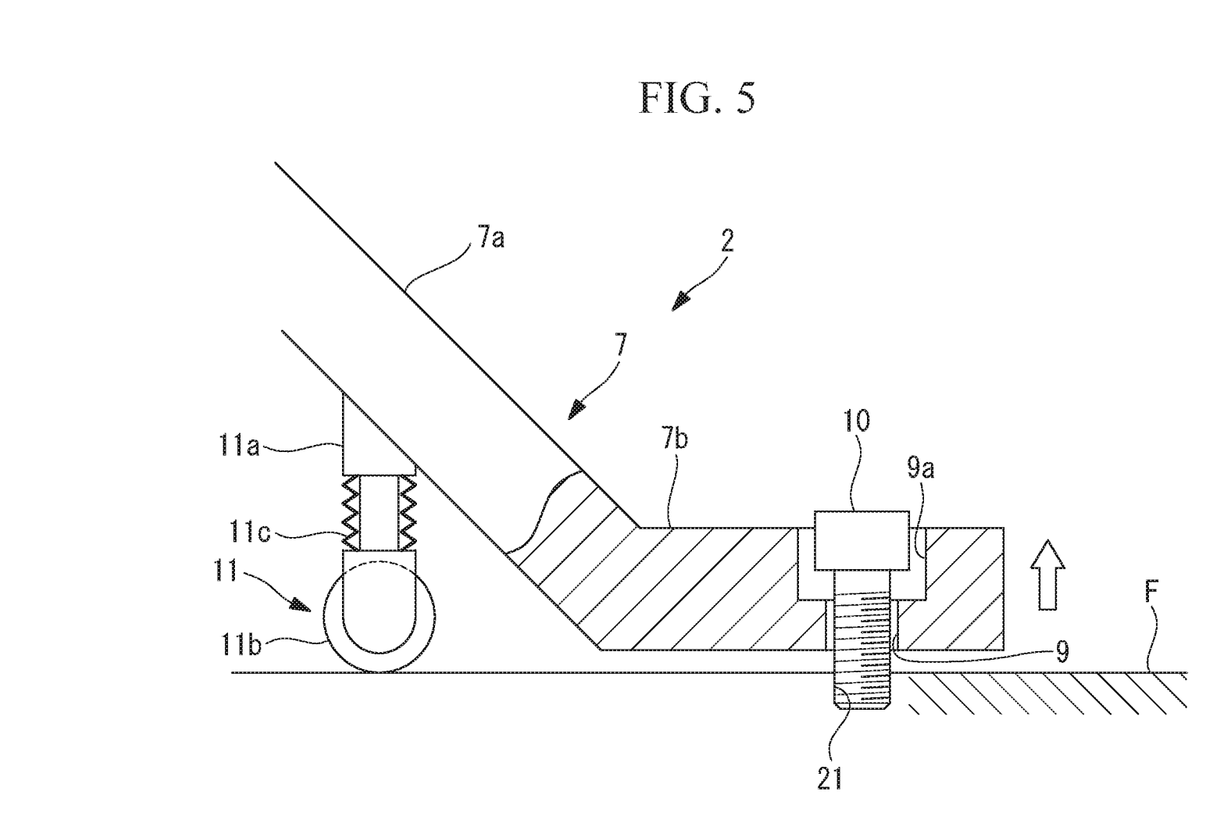
FIG. 5 is a partial longitudinal sectional view illustrating a state where an anchor bolt for securing the base of the industrial machine illustrated in FIG. 1 is loosened.

Moreover, the frustum-shaped portion 7a of the base 2 is hollow in the lower part, and accommodates a plurality of (for example, four) wheels (friction reducing member; see FIG. 3) 11 protrusible from the bottom surface of the supporting leg member 7 inside of the frustum-shaped portion 7a. As illustrated in FIGS. 4 and 5, movable members 11b are supported by supporting shafts 11a secured inside the frustum-shaped portion 7a to be vertically movable, and each of the wheels 11 is supported by the corresponding movable member 11b to be rotatable about a horizontal axis. A spring (elastic member) 11c is disposed between each set of the supporting shafts 11a and the movable members 11b to apply elastic restoring force to vertically separate the supporting shafts 11a and the movable members 11b.

While the springs 11c are in a first state illustrated in FIG. 5 where the springs 11c are stretched, the springs 11c have rigidity capable of generating the elastic restoring force with which the tare of the robot 1 can be supported when all the wheels 11 are used. Thus, in the first state illustrated in FIG. 5, the robot 1 can stand on its own using only the wheels 11.

On the other hand, as illustrated in FIG. 4, when the base 2 is vertically pushed down by tightening the anchor bolts 10 into screw holes 21 in the floor surface F, the springs 11c are compressed by the vertical force, and the wheels 11 are accommodated inside the frustum-shaped portion 7a. In this manner, the springs 11c enter a second state where the wheels 11 are raised to the same level as or above the bottom surface of the base 2. Thus, the bottom surface of the base 2 is brought into firm contact with the floor surface F, and the base 2 is immovably secured onto the floor surface F by the friction between the bottom surface of the base 2 and the floor surface F.

Operations of the robot 1 according to this embodiment configured as above will now be described.

To use the robot 1 according to this embodiment, the anchor bolts 10 are fitted into the through holes 9 at the four corners of the rim portion 7b of the supporting leg member 7, and the anchor bolts 10 are tightened into the screw holes 21 formed in the floor surface F.

While the anchor bolts 10 are not tightened, the robot 1 is supported only by the wheels 11 as illustrated in FIG. 5, and the rim portion 7b of the supporting leg member 7 of the base 2 is floating from the floor surface F. Tightening the anchor bolts 10 from this state causes the base 2 to be lowered against the elastic restoring force of the springs 11c by the axial force generated in the anchor bolts 10, and the wheels 11 are completely accommodated inside the frustum-shaped portion 7a of the supporting leg member 7 as illustrated in FIG. 4.

Thus, the bottom surface of the base 2 is brought into firm contact with the floor surface F, and the robot 1 is immovably secured onto the floor surface F by the friction between the bottom surface of the base 2 and the floor surface F.

That is, securing the base 2 onto the floor surface F using the anchor bolts 10 allows the robot 1 to be maintained in a stable state when the first arm 4 and the second arm 5 are also extended in the horizontal direction. Moreover, the robot 1 can be stably operated also when a heavy load is supported at the tip of the wrist 6 or when a large inertial force is applied to the base 2 during high speed operation.

Moreover, the robot 1 according to this embodiment can operate as a floor-installable six-axis vertical articulated robot due to the base 2 configured to be secured onto the floor surface F.

In this case, the robot 1 includes the base 2 including the flat supporting leg member 7 and the cylindrical columnar member 8 extending vertically upward from the center of the leg member 7, and the thickness of the columnar member 8 is equal to the thickness of the first arm 4. Thus, the robot 1 does not occupy a large space, and a large working space is advantageously left for operators.

Moreover, the swivel body 3 is disposed at the top end of the slender columnar member 8, and the columnar member 8 is made longer than the first arm 4. Thus, in addition to the movements performed while the first arm 4 is located above the second axis B as illustrated in FIG. 1, movements similar to the movements performed by a robot hanging from the ceiling can also be performed while the first arm 4 is located below the second axis B.

While the robot 1 is secured onto the floor surface F, the heads of the anchor bolts 10 used for securing are completely accommodated inside the counterbores 9a formed in the upper parts of the through holes 9 in the base 2. Thus, the top surface of the rim portion 7b is flat without any projections. In this manner, the robot 1 does not include any obstacles occupying a large space beside the base 2 unlike the outriggers in the prior art, and is allowed to have a large motion range. Moreover, the operators are advantageously prevented from stumbling on the heads of the anchor bolts 10.

Figure 2:
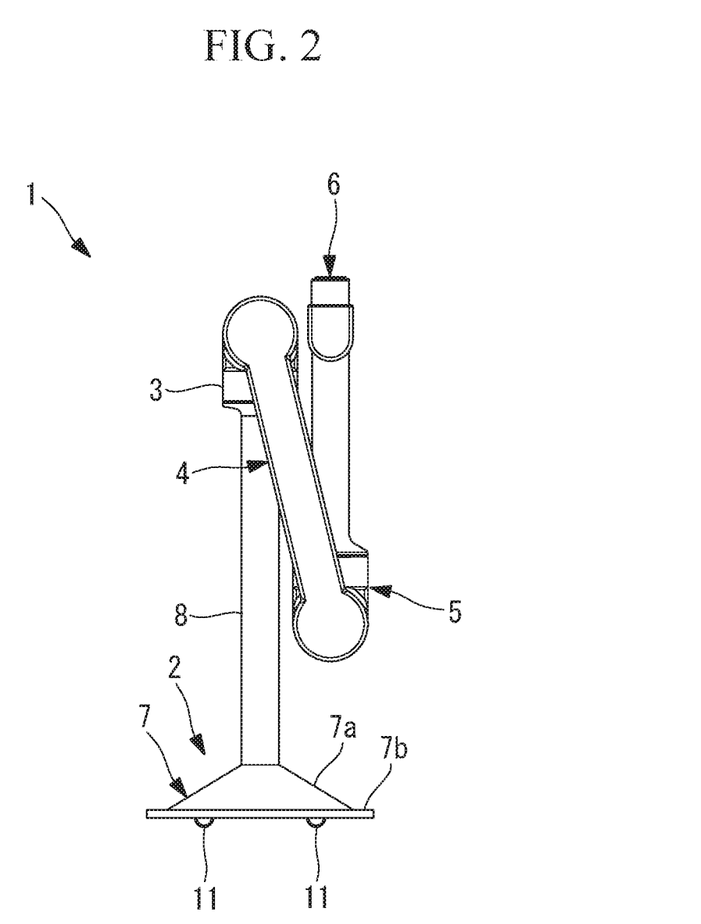
FIG. 2 is a side view illustrating the posture of the industrial machine illustrated in FIG. 1 during relocation.
Figure 6:
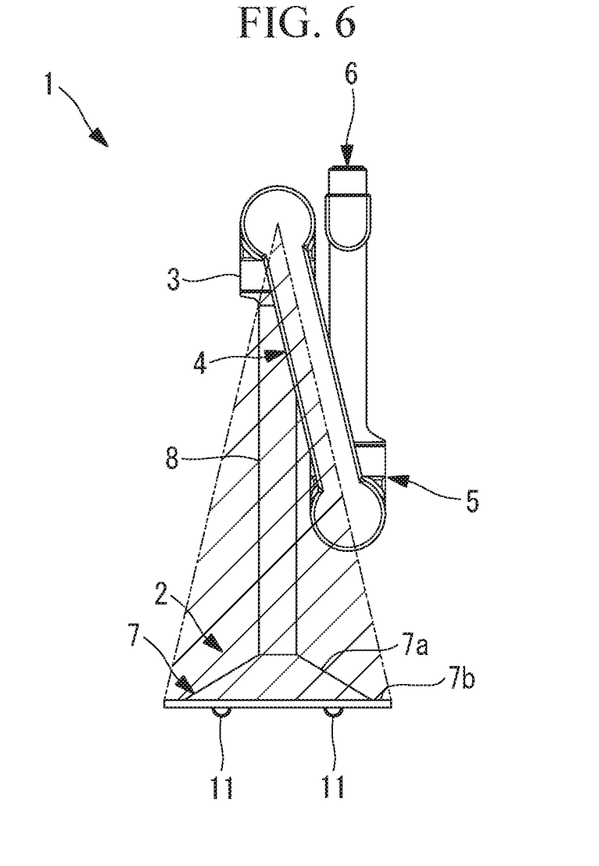
FIG. 6 is a side view illustrating the position of the center of gravity of the industrial machine illustrated in FIG. 1 during relocation.

To relocate the robot 1, the first arm 4 and the second arm 5 are folded such that the second arm 5 is disposed parallel to the columnar member 8 as illustrated in FIG. 2. This causes the position of the center of gravity of the entire system to be lowered, and thus causes the robot 1 to be less prone to falling. In this state, as illustrated in FIG. 6, the position of the center of gravity of the entire system is located inside a conic space (hatched area in FIG. 6) including the supporting leg member 7 as the bottom surface and the intersection of a vertical line passing through the center of the supporting leg member 7 and a plane including the second axis B as a vertex. Thus, the center of gravity would be kept inside the supporting leg member 7 if the robot 1 is inclined to some extent, allowing the robot 1 to be less prone to falling.

Loosening the anchor bolts 10 securing the base 2 onto the floor surface F in this state causes the axial force of the anchor bolts 10 to be reduced, and the wheels 11 are pushed down by the elastic restoring force of the springs 11c supporting the wheels 11. As a result, the bottom surface of the base 2 is lifted from the floor surface F, and the entire robot 1 is supported only by the wheels 11.

In this manner, the wheels 11 partially protruding from the bottom surface of the base 2 downward reduce the friction between the floor surface F and the rim portion 7b of the base 2. Thus, a horizontal force applied by an operator to the robot 1 in this state causes the wheels 11 to rotate about the horizontal axes to roll on the floor surface F. In this manner, the robot 1 is readily moved along the floor surface F.

Moreover, the robot 1 according to this embodiment raises and lowers the base 2 using the anchor bolts 10 for securing the base 2 onto the floor surface F, and thus any specific mechanisms such as handles or electric mechanisms are not required to cause the wheels 11 to protrude from the bottom surface of the base 2. This advantageously prevents the robot 1 from increasing in size, and also enables the robot 1 to be configured at low cost.

In this embodiment, the wheels 11 are illustrated as an example of a friction reducing member. However, the friction reducing member is not limited to this, and may be a roller or a sphere rotatable about a horizontal axis or a sheet or a block composed of a material with a small sliding resistance. The material with a small sliding resistance includes, for example, a material composed of polyamide and molybdenum dioxide added thereto, melamine resin, and tetrafluoroethylene resin.

The springs 11c may be any springs such as coiled springs, coned disc springs, and torsion coil springs. Moreover, other elastic member such as rubber may be used instead of the springs 11c.

The four wheels 11 are illustrated as an example. However, the number is not limited to this, and any number of wheels may be used. More wheels increase the cost. However, the rigidity of the springs 11c may be lower, resulting in easier designing. Moreover, the number of anchor bolts 10 is not limited to four, and may be any other number.

In this embodiment, a six-axis vertical articulated robot including the swivel body 3 disposed at the upper part of the base 2 to be rotatable about the first axis A, the first arm 4 disposed on the swivel body 3 to be swingable on the second axis B, the second arm 5 disposed at the tip of the first arm 4 to be swingable on the third axis C, and the three-axis wrist 6 disposed at the tip of the second arm 5 is illustrated as the robot 1. However, robots with any other axis configurations may be used instead of this.

Moreover, in this embodiment, the robot 1 including the base 2 including the supporting leg member 7 and the columnar member 8 is illustrated as an example. However, the robot 1 is not limited to this, and robots with any other configurations may be used. Furthermore, the robot 1 is illustrated as an example of the industrial machine 1. However, the present invention is not limited to this, and may be applicable to any industrial machine 1 such as machine tools.

Moreover, the floor surface F is illustrated as an example of an installation surface. However, the present invention is applicable to a case where the robot 1 is installed on an installation surface other than the floor surface F.

Next, a relocating mechanism 12 of the industrial machine 1 according to an embodiment of the present invention will be described with reference to the drawings.

Figure 7:
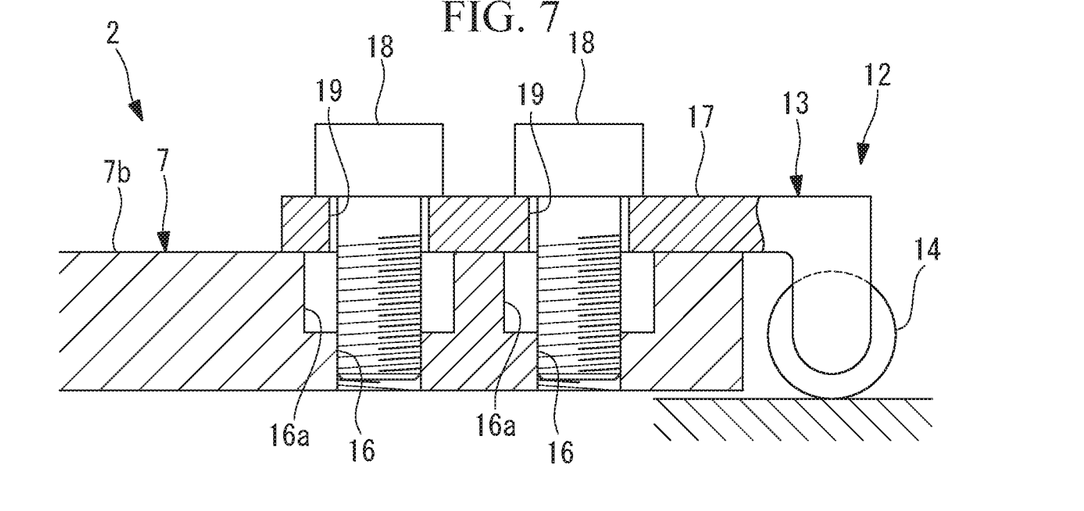
FIG. 7 is a partial longitudinal sectional view illustrating a state of a relocating mechanism of the industrial machine according to an embodiment of the present invention while the industrial machine is being relocated.
Figure 8:
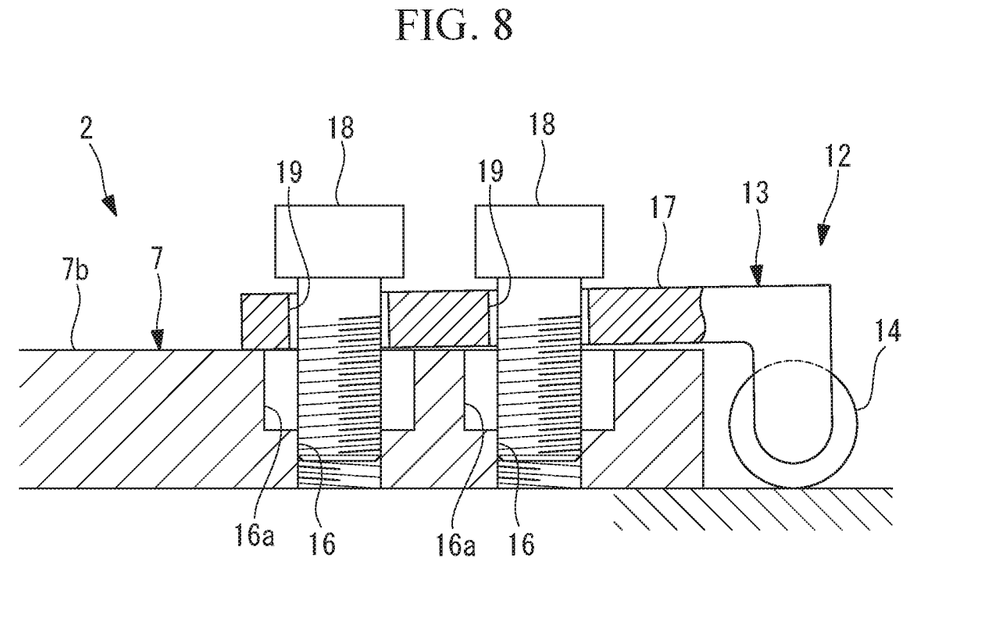
FIG. 8 is a partial longitudinal sectional view illustrating a state where the base is in firm contact with the floor surface while bolts in the relocating mechanism illustrated in FIG. 7 are loosened.

The relocating mechanism 12 according to this embodiment is a relocating mechanism of the robot 1, and is provided for a base 2 of the robot 1 similar to that illustrated in FIG. 1 as illustrated in FIGS. 7 and 8. The relocating mechanism 12 includes a bracket 13 detachable from the tabular rim portion 7b brought into firm contact with the floor surface F during installation and a friction reducing member supported by the lower part of the bracket 13.

Figure 9:
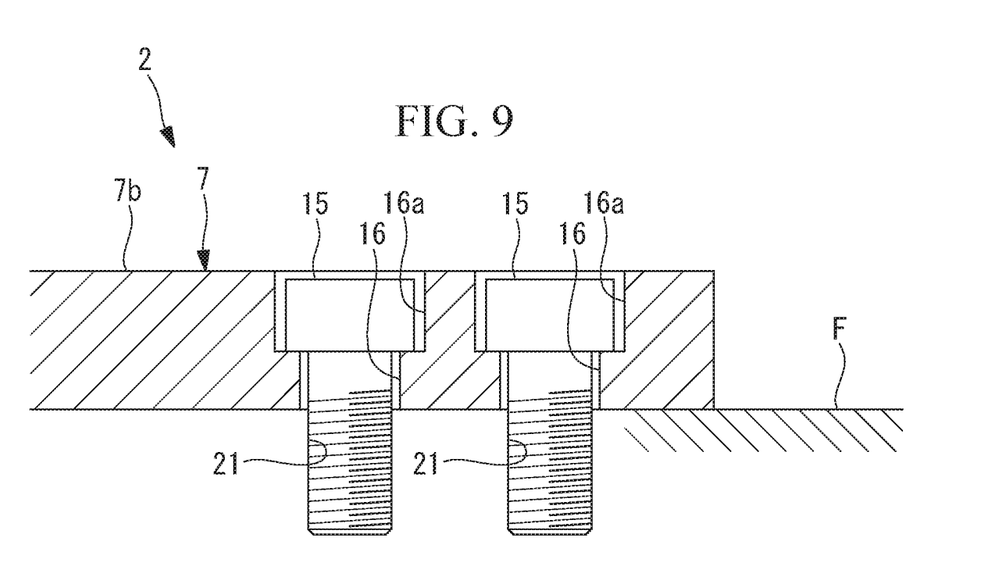
FIG. 9 is a partial longitudinal sectional view illustrating a state where the base of the industrial machine is secured onto the floor surface by removing the relocating mechanism illustrated in FIG. 7.

In this embodiment, as illustrated in FIG. 9, two screw holes (through holes) 16 into which anchor bolts (first fastener) 15 are fitted are formed in each of the four corners of the rim portion 7b, which is substantially square when viewed in plan, of the robot 1.

Each of the screw holes 16 has an inner diameter larger than the outer diameter of the anchor bolts 15, and an internal thread is cut to tighten screw bolts 18 (described below). Each of the through holes 16 has a counterbore 16a formed in the upper part to accommodate the head of an anchor bolt 15.

As illustrated in FIGS. 7 and 8, the bracket 13 includes a tabular portion 17 disposed along the top surface of the rim portion 7b. The tabular portion 17 includes two through holes 19 formed at the same pitch as the pitch of the two through holes 16 formed at each corner of the rim portion 7b. The inner diameter of the through holes 19 is larger than the outer diameter of the bolts (second fastener) 18 tightened into the screw holes 16 of the rim portion 7b, and is smaller than the outer diameter of the heads of the bolts 18. Tightening the bolts 18 fitted in the through holes 19 into the screw holes 16 of the rim portion 7b enables the bracket 13 to be secured to the rim portion 7b.

The friction reducing member is a wheel 14 supported to be rotatable about a horizontal axis while the bracket 13 is secured to the top surface of the rim portion 7b. The wheel 14 partially protrudes downward from the bottom surface of the base 2 in the state illustrated in FIG. 7 where the bracket 13 is firmly secured to the top surface of the rim portion 7b. Thus, tightening the bolts 18 into the screw holes 16 of the rim portion 7b causes the wheel 14 pushed down by the axial force applied to the bolts 18 to push the floor surface F, and as a result, the base 2 is lifted from the floor surface F.

Operations of the relocating mechanism 12 of the robot 1 according to this embodiment configured as above will now be described.

To relocate the robot 1 using the relocating mechanism 12 according to this embodiment, the anchor bolts 15 securing the base 2 onto the floor surface F as illustrated in FIG. 9 are first removed to allow the robot 1 to be relocated.

Next, as illustrated in FIG. 8, the tabular portion 17 of the bracket 13 is disposed on the top surface of the rim portion 7b such that the two through holes 19 align with the two screw holes 16 of the rim portion 7b, and the bolts 18 fitted in the through holes 19 are tightened into the screw holes 16 of the rim portion 7b.

Then, as illustrated in FIG. 7, when the bolts 18 are securely tightened, the wheel 14 disposed at the lower part of the bracket 13 pushes the floor surface F, and the bottom surface of the base 2 is lifted from the floor surface F. This reduces the friction between the base 2 and the floor surface F. Thus, a horizontal force applied by an operator to the robot 1 causes the wheel 14 to rotate about the horizontal axis to roll on the floor surface F. In this manner, the robot 1 is readily moved along the floor surface F.

To install the robot 1 at a predetermined position, the above-described procedure is performed in reverse after the robot 1 is moved to the predetermined position. From the state illustrated in FIG. 7, the bolts 18 are loosened to bring the bottom surface of the base 2 into firm contact with the floor surface F as illustrated in FIG. 8. Then, as illustrated in FIG. 9, the bracket 13 is removed from the rim portion 7b, and the anchor bolts 15 fitted in the screw holes 16 of the rim portion 7b are tightened into the screw holes 21 in the floor surface F. In this manner, the robot 1 is firmly secured onto the floor surface F. In this case, the outer diameter of the external thread portion of the anchor bolts 15 needs to be smaller than the outer diameter of the external thread portion of the bolts 18.

In accordance with the relocating mechanism 12 according to this embodiment, the anchor bolts 15 for installation do not protrude from the top surface of the rim portion 7b while the robot 1 is installed on the floor surface F as illustrated in FIG. 9. Thus, the relocating mechanism 12 does not occupy the space around the robot 1, and does not obstruct operations of the robot 1 or operators. Moreover, the bottom surface of the base 2 can be readily lifted from the floor surface F using the screw holes 21 for securing the robot 1 onto the floor surface F with the anchor bolts 15, enabling easy relocation by the rotation of the wheel 14.

In this embodiment, the bracket 13 is secured using the two bolts 18 fitted into the two screw holes 16 formed in the rim portion 7b. Thus, the bracket 13 does not rotate about a vertical axis, and is stable during relocation. The numbers of screw holes 16 and bolts 18 may be three or more. In a case where the bracket 13 may rotate about a vertical axis to some extent, the numbers of screw holes 16 and bolts 18 may be one.

Moreover, in this embodiment, a roller or a sphere, or a sheet or a block with a small sliding resistance against the floor surface may be used as the friction reducing member instead of the wheel 14.

From the above-described embodiment, the following invention is derived.

An aspect of the present invention provides an industrial machine including a base including a through hole vertically passing through the base and installed on an installation surface using a fastener through the through hole and a friction reducing member configured to protrude from a bottom surface of the base to reduce friction between the base and the installation surface. The friction reducing member is lowered below the bottom surface of the base during relocation and raised to the same level as or above the bottom surface of the base during installation by a vertical force applied to the base using the through hole.

According to this aspect, when the industrial machine is installed on the installation surface such as a floor surface, the friction reducing member is raised to the same level as or above the bottom surface of the base by the vertical force applied to the base using the through hole formed in the base. The fastener is then tightened through the through hole formed in the base to bring the bottom surface of the base into firm contact with the installation surface. Thus, the industrial machine can be securely and immovably supported on the installation surface by the friction. Moreover, the fastener does not occupy spaces around the industrial machine while the industrial machine is installed, and does not obstruct operations of the industrial machine or operators.

On the other hand, when the industrial machine is relocated, the fastener is removed to unfasten the base from the installation surface, and a vertical force is applied to the base using the through hole. This causes the friction reducing member to be lowered below the bottom surface of the base. Thus, the base is lifted from the installation surface, and the industrial machine can be readily moved along the installation surface while the friction reducing member reduces friction.

In the above-described aspect, the fastener may be a bolt having an outer diameter smaller than an inner diameter of the through hole.

This enables the bolt fitted in the through hole to be tightened into a screw hole formed in the installation surface, and allows the bottom surface of the base to be firmly yet easily secured onto the installation surface.

Moreover, in the above-described aspect, the through hole may include, in an upper part thereof, a counterbore configured to at least partially accommodate a head of the bolt.

When the bolt is tightened into the screw hole formed in the installation surface, the head of the bolt is disposed at the upper part of the through hole. However, with the above-described configuration, the head of the bolt is at least partially accommodated inside the counterbore, and the protrusion of the bolt from the top surface of the base is minimized. In this manner, the fastener occupies a minimum space around the industrial machine while the industrial machine is installed.

Moreover, in the above-described aspect, the industrial machine may further include an elastic member generating elastic restoring force to lift the base from the installation surface by pushing the friction reducing member against the installation surface. During installation, the elastic member may be elastically deformed by the vertical force applied to the base by the fastener to lower the base and to bring the bottom surface of the base into firm contact with the installation surface, and during relocation, the vertical force applied to the base by the fastener may be reduced, and the elastic member may lift the base from the installation surface using the elastic restoring force.

In this manner, during relocation of the industrial machine, the axial force of the bolt elastically deforming the elastic member is reduced by loosening the bolt tightened into the screw hole in the installation surface through the through hole to lower the friction reducing member by the elastic restoring force. Thus, the base is lifted from the installation surface, and the industrial machine is supported by the friction reducing member. Consequently, the industrial machine can be readily moved along the installation surface with small friction.

On the other hand, to install the industrial machine onto the installation surface, the bolt fitted in the through hole formed in the base is tightened into the screw hole formed in the installation surface. This causes the vertical axial force applied to the base by the bolt to increase, and the elastic member is elastically deformed to lower the base. This causes the bottom surface of the base to be brought into firm contact with the installation surface, and thus the industrial machine to be reliably secured onto the installation surface. The bolt for securing the industrial machine onto the installation surface can switch the state of the friction reducing member between the state during relocation where the friction reducing member is lower than the bottom surface of the base and the state during installation where the friction reducing member is at the same level as or above the bottom surface of the base.

Moreover, another aspect of the present invention provides a relocating mechanism of an industrial machine including a bracket attachable to a through hole using a second fastener while a first fastener is removed from the through hole, the industrial machine including a base including the through hole vertically passing through the base and the base being installed onto an installation surface using the first fastener through the through hole, and a friction reducing member attached to the bracket. The friction reducing member is lowered below a bottom surface of the base by a vertical force applied between the base and the bracket by the second fastener using the through hole during relocation of the industrial machine.

With this, when the industrial machine is installed on the installation surface, the first fastener is tightened through the through hole formed in the base. On the other hand, when the industrial machine is relocated, the first fastener is removed, and the second fastener is tightened into the through hole to attach the bracket. The vertical force applied by the second fastener between the base and the bracket is increased to lower the bracket and thus to lower the friction reducing member provided for the bracket below the bottom surface of the base. Thus, the base is lifted from the installation surface, and the industrial machine can be readily relocated along the installation surface while the friction reducing member reduces friction.

In the above-described aspect, the second fastener may be a bolt, and an internal thread may be cut in the through hole to enable the second fastener to be tightened into the through hole.

REFERENCE SIGNS LIST

1 Robot (industrial machine)
2 Base
9 Through hole
9a, 16a Counterbore
10, 15 Anchor bolt (fastener, first fastener)
11, 14 Wheel (friction reducing member)
11c Spring (elastic member)
12 Relocating mechanism
13 Bracket
16 Screw hole (through hole)
18 Bolt (second fastener)
F Floor surface (installation surface)

The invention claimed is:

1. A relocating mechanism of an industrial machine, the relocating mechanism comprising:

a bracket including a first through hole vertically passing through the bracket and configured to be attachable, through the first through hole, to a second through hole provided in a member of the industrial machine using a fastener, the bracket being arranged adjacent to the member in a state in which the bracket and the member are in contact with each other;

a friction reducing member attached to the bracket; and wherein a vertical force applied between the member and the bracket by the fastener received in the second through hole causes the member to be lifted relative to, and supported at least in part by, the friction reducing member.

2. The relocating mechanism of the industrial machine according to claim 1, wherein the fastener is a bolt.

* * * * *